United States Patent
Trueba et al.

(10) Patent No.: US 7,956,097 B2
(45) Date of Patent: *Jun. 7, 2011

(54) CURABLE THERMALLY EJECTABLE PRINTING FLUID

(75) Inventors: Kenneth E. Trueba, Corvallis, OR (US); William Allen Buskirk, Albany, OR (US)

(73) Assignee: ImTech, Inc., Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/797,562

(22) Filed: Jun. 9, 2010

(65) Prior Publication Data

US 2010/0245504 A1    Sep. 30, 2010

Related U.S. Application Data

(63) Continuation of application No. 11/387,511, filed on Mar. 22, 2006, now Pat. No. 7,763,668.

(60) Provisional application No. 60/664,201, filed on Mar. 23, 2005.

(51) Int. Cl.
*C08F 2/50* (2006.01)
*C08J 3/28* (2006.01)

(52) U.S. Cl. ............. 522/76; 522/71; 522/74; 522/79; 522/80; 522/90; 522/96; 522/99; 522/104; 522/103; 522/100; 522/107; 522/178; 522/173; 522/172; 522/181; 106/31.13; 106/31.28; 106/31.6; 523/160; 347/171; 347/214; 347/84; 347/95; 347/100

(58) Field of Classification Search .............. 522/182, 522/71, 74, 76, 79, 80, 90, 96, 99, 104, 100, 522/103, 107, 178, 173, 172, 181, 75; 106/31.28, 106/31.13, 31.6; 347/51; 523/160
See application file for complete search history.

(56) References Cited

U.S. PATENT DOCUMENTS

| | | | |
|---|---|---|---|
| 4,978,969 | A | 12/1990 | Chieng |
| 5,062,892 | A | 11/1991 | Halki |
| 5,062,893 | A | 11/1991 | Adamic et al. |
| 5,063,269 | A | 11/1991 | Hung |
| 5,275,646 | A | 1/1994 | Marshall et al. |
| 5,614,007 | A | 3/1997 | Kurabayashi et al. |
| 5,679,724 | A | 10/1997 | Sacripante et al. |
| 5,782,967 | A | 7/1998 | Shirota et al. |
| 5,792,249 | A | 8/1998 | Shirota et al. |
| 5,795,376 | A | 8/1998 | Ide |
| 6,013,123 | A | 1/2000 | Scarpetti |
| 6,114,406 | A | 9/2000 | Caiger et al. |
| 6,254,669 | B1 | 7/2001 | Lavery et al. |
| 6,322,620 | B1 | 11/2001 | Xiao |
| 6,593,390 | B1 | 7/2003 | Johnson et al. |
| 6,610,129 | B1 | 8/2003 | Sader et al. |
| 2002/0196320 | A1 | 12/2002 | Hale et al. |
| 2003/0071964 | A1 | 4/2003 | Doshi |

FOREIGN PATENT DOCUMENTS

| | | |
|---|---|---|
| DE | 31 32 247 A1 | 8/1982 |
| EP | 0 425 150 A2 | 5/1991 |
| EP | 0 499 425 A1 | 8/1992 |
| EP | 0 848 045 A1 | 6/1998 |

OTHER PUBLICATIONS

SIDS Initial Assessment Report for SIAM 13, Nov. 6-9, 2001, Switzerland, UNEP Publications, p. 53, 3 pages.

*Primary Examiner* — Sanza L McClendon
(74) *Attorney, Agent, or Firm* — Alleman Hall McCoy Russell & Tuttle LLP

(57) ABSTRACT

Various embodiments related to curable printing fluids are disclosed. One example embodiment provides a curable printing fluid composition for a thermal fluid ejection device, the composition comprising a curable liquid-phase monomer, a substantially nonaqueous volatile driver fluid capable of being vaporized by a thermal fluid ejection printhead, an initiator, a phosphate ester resistor protectant, and a colorant comprising a dye.

20 Claims, No Drawings

CURABLE THERMALLY EJECTABLE PRINTING FLUID

CROSS-REFERENCE TO RELATED APPLICATIONS

The present application is a continuation of U.S. patent application Ser. No. 11/387,511, titled CURABLE THERMALLY EJECTABLE PRINTING FLUID and filed Mar. 22, 2006, which claims priority to U.S. Provisional Patent Application Ser. No. 60/664,201, titled NON-AQUEOUS RADIATION-CURABLE INK COMPOSITION AND METHOD OF PRINTING IN THERMALLY DRIVEN INKJET SYSTEMS and filed Mar. 23, 2005. The disclosures of each of these applications are hereby incorporated by reference.

TECHNICAL FIELD

The present disclosure relates to curable thermally ejectable printing fluids and methods for printing with curable thermally ejectable printing fluids.

BACKGROUND

Fluid ejection printing devices, such as inkjet printers, print a printing fluid onto a page by ejecting droplets of the fluid onto a printing medium. Some fluid ejection printing devices print by producing a continuous stream of printing fluid droplets, for example, with a piezoelectric device, and then selectively deflecting the individual droplets to print a desired pattern of droplets onto the printing medium. Other fluid ejection printing devices, known as "drop-on-demand" devices, selectively eject drops of printing fluid, rather than continuously. Some devices utilize piezoelectric elements to trigger the ejection of printing fluid via a change in ejection chamber volume, while others use electrically resistive elements to thermally vaporize a component of the printing fluid, thereby selectively generating a bubble to drive printing fluid out of each orifice.

Thermal fluid ejection printing devices typically include an array of precisely formed nozzles (typically having a diameter between approximately 8 and 60 microns) located on a nozzle plate and attached to a printhead substrate. The substrate includes an array of firing chambers that receive printing fluids from one or more printing fluid reservoirs. Each chamber has a thin-film resistor, which may be referred to as a "firing resistor", located opposite the nozzle. Printing fluid collects between the nozzle and the firing resistor for ejection through the nozzle. The substrate and nozzle plate are held and protected by an outer packaging, sometimes called a print cartridge. The total assembly may be referred to as a printhead. The firing of printing fluid droplets is typically controlled via a microprocessor. Upon energization of the firing resistor, a bubble of vaporized printing fluid components forms on the resistor, thereby expelling a droplet of printing fluid through the nozzle.

Many different types of printing fluids are known, including non-curable and curable printing fluids. Conventional thermally-ejectable printing fluids are generally aqueous-based and are non-curable. Therefore, the fluids tend to be relatively slow drying, and susceptible to smearing and color running during drying. In contrast, curable printing fluids offer the advantage of fast, almost instantaneous, drying times, thereby allowing a printed item to be handled almost immediately after printing. Instantaneous curing also enables the use of a much broader range of substrates, such as non-porous substrates, which do not absorb the ink. Examples include, but are not limited to, glass, plastic, metal, and many plastic coated paper products.

Generally, curable printing fluids include a polymerizable component that is cured by exposure to an energy source, such as UV light, heat, an electron beam, etc., after printing. Curable printing fluids also may help to reduce crusting or clogging of the printhead by remaining in the liquid phase inside of the printhead, thereby reducing servicing requirements.

However, current curable fluid ejection printing fluids may suffer various drawbacks. For example, conventional curable fluid ejection printing fluids may not be printable via thermal ejection, and therefore may require the use of more expensive and maintenance intensive piezoelectric printheads. Additionally, some curable printing fluids may include organic solvents such as methyl ethyl ketone in which the curable components are dissolved. Such solvents may require additional equipment and care for safe evaporation and disposal.

SUMMARY

Various embodiments related to curable printing fluids are disclosed. One example embodiment provides a curable printing fluid composition for a thermal fluid ejection device, the composition comprising a curable liquid-phase monomer, a substantially nonaqueous volatile driver fluid capable of being vaporized by a thermal fluid ejection printhead, an initiator, a phosphate ester resistor protectant, and a colorant comprising a dye.

DETAILED DESCRIPTION

The present disclosure provides various embodiments of curable, thermally ejectable printing fluids suitable for use in thermal fluid ejection printing devices. In some embodiments, the printing fluid includes at least one curable monomer, a volatile driver fluid to drive the ejection of the printing fluid from a thermal fluid ejection orifice, and a resistor protectant for improving the lifetime of a thermal fluid ejection device used to print with the fluid. Various embodiments of the printing fluid also may include other components, including but not limited to one or more colorants, oligomers, polymerization initiators, adhesion promoters, etc. Furthermore, a printing fluid according to the present disclosure may be substantially non-aqueous, yet may possess physical characteristics that permit the fluids to be printed with a thermal fluid ejection printing device designed for printing aqueous printing fluids.

One example of a specific application for which a rapidly curable printing fluid may offer advantages over non-curable printing fluids is in the coding of products during a manufacturing process. Such printing may occur while the product or product part is moving along a conveyor or assembly line, sometimes at high speeds. Under such conditions, non-curable printing fluids may smear or spread upon contact with other product or downstream structures. This may cause the printed product code to be difficult to read by downstream scanners and/or workers, and therefore may result in manufacturing errors. However, a curable printing fluid may be cured immediately after printing, providing an instantly durable, high-quality image and thereby minimizing smearing or spreading. Other applications include mail addressing, CD labeling, ID card printing, web printing, mail printing, outdoor signage printing, and many other applications where printing occurs on non-porous substrates and also in applications in which the product is contacted or stacked immediately requiring a marking process that dries immediately.

Prior curable printing fluids for fluid ejection printing devices have generally been configured for use in piezoelectric fluid ejection printing devices, in both drop-on-demand and continuous-drop configurations. However, piezoelectric fluid ejection devices may present various drawbacks compared to thermal fluid ejection devices. For example, piezoelectric printheads typically cost more than thermal printheads. For this reason, piezoelectric printheads generally are provided as separate components from the printing fluid supply. In contrast, the relatively low cost of many thermal fluid ejection printheads allow them to be integrated into disposable or replaceable printing fluid supply cartridges. Therefore, thermal fluid ejection printheads may have lower initial and repair/replacement costs than piezoelectric printheads.

The desired physical properties of a printing fluid may depend on the intended use of the printing fluid. For example, to be ejectable from a conventional thermal printhead designed for an aqueous-based printing fluid, the fluid should have a viscosity in a range of 1-20 cps, a surface tension in a range of 20-50 dyne/cm, and an ability to form a drive bubble to force printing fluid out of the printhead nozzle. Also, the printing fluid should be able to withstand the elevated temperatures that may be encountered during thermal fluid ejection without degrading printing quality and/or printhead performance to an unsatisfactory extent.

Current curable piezoelectric printing fluid formulations may be unsuitable for use with a thermal fluid ejection printhead. For example, current curable piezoelectric printing fluid formulations may be unable to form a drive bubble of sufficient strength to eject a fluid droplet from the nozzle. Additionally, piezoelectric printing typically occurs with a printing fluid temperature at or around room temperature or up to ~50 degrees C. In contrast, temperatures within a thermal fluid ejection firing chamber can exceed 300 degrees C. Piezoelectric printing fluids therefore may not be suitable for operation in this environment.

In contrast, the disclosed printing fluids may be both curable and ejectable via a thermal fluid ejection printhead. The rapid curability of the disclosed printing fluids may allow the fluids to be used in applications in which fast drying times are required, including but not limited to product coding applications. As mentioned above, a printing fluid according to the present disclosure may include one or more curable monomers that are polymerizable to cure the monomers after printing. Besides being curable, a monomer or monomer mixture may be configured to have viscosity and surface tension characteristics suitable for proper fluid ejection from a selected thermal fluid ejection printhead. For example, where a thermal fluid ejection printhead is configured for the ejection of aqueous-based printing fluids, the monomer or monomer mixture may be configured to have a viscosity in a range of 1-20 cps, and a surface tension in a range of 20-50 dyne/cm. It will be appreciated that the surface tension and/or viscosity of the monomer or monomer mixture may be modified as appropriate by other printing fluid components, including but not limited to the driver fluid, initiators, resistor protectants, etc. Furthermore, it will be appreciated that other viscosity and surface tension ranges may be appropriate depending upon the specific requirements of a selected printing device.

The use of a liquid phase monomer or monomer mixture allows the monomer or mixture to be a primary or substantial component of the printing fluid. In this manner, the curing of the monomer on a printing medium converts the liquid phase monomer or monomer mixture into a solid phase, thereby greatly reducing or even eliminating the need for drying the printing fluid after printing compared to conventional aqueous or solvent-based thermally ejectable printing fluids. The rapid cure time may help to prevent smearing or running of colors. Furthermore, the low solvent content of such a printing fluid compared to prior solvent-based printing fluids may help to prevent the outgassing of harmful organic solvents during drying.

Depending on the application for which a printing fluid is used, a printing fluid according to the present disclosure may include at least one mono-functional monomer and at least one multi-functional monomer. The mono-functional monomer may have a lower viscosity that the multi-functional monomer, which may help to lower the overall viscosity of the printing fluid. On the other hand, the multi-functional monomer may permit cross-linking of the printed polymer film to occur, which may improve the durability of the printed polymer film compared to a linear polymer printed film. Mixtures of mono- and di-functional monomers may provide better thermal fluid ejection printing performance than mixtures of higher functional monomers. For example, it has been found that monomer mixtures containing some higher-functional monomers may result in the formation of deposits on the firing resistors ("koga") more rapidly than for mixtures without the higher-functional monomers, which may shorten the printhead lifetime. In alternative embodiments, printing fluids may have only monofunctional monomers, or no monofunctional monomers.

Any suitable monomer or mixture of monomers may be used. Examples of suitable monomers include, but are not limited to, acrylic monomers with functionalities of one or more. Some specific examples of suitable commercially available monomers may include, but are not limited to, the following available from Sartomer of Exton, Pa.: SR-201 alkyl methacrylate, SR-203 tetrahydrofurfuryl methacrylate, SR-206 ethylene glycol demethacrylate, SR-212 1,3 butylene glycol diacrylate, SR-213 1,4 butane diol dimethacrylate, SR-238 urethane acrylate blended with tripropylene glycol diacetate, SR-256 2-(2-ethoxyethoxy) ethylacrylate, SR-259 polyethylene glocol (200) diacrylate, SR-295 pentaneryheritol tetraacrylate), SR-306 tripropylene glycol diacetate), SR-313B lauryl methacrylate, SR-335 lauryl acrylate, SR-339 2-phenoxyethyl acrylate, SR-339A proprietary, SR-344 polyethylene glocol (400) diacrylate, SR-355 di-trimethylopropane tetraacrylate, SR-368 tris-(2hydroxy ethyl) isocyanurate triacrylate, SR-395 isodecyl acrylate, SR-399 dipentaneryheritol pentaacrylate, SR-415 ethoxylated (20) trimethylopropane triacrylate, SR440 isooctyl acrylate, SR-444 pentanerythritol triacrylate, SR-489D proprietary, SR-492 propoxylated (3) trimethylopropane triacrylate, SR-493D tridecyl methacrylate, SR-494 ethoxylated (4) pentacrytheritol tetraacrylate, SR-506 isobornyl acrylate, SR-508IJ dipropylene glycol diacrylate, SR-113, SR-1137, SR-9003 propoxylated neopentyl glycol diacrylate, SR-9008 alkoxylated trifunctional acrylate ester, SR-9011 trifunctional methacrylate ester, SR-9012 trifunctional acrylate ester, SR-9041 pentaacrylate ester, SR-909 proprietary, SR-NTX-5249 proprietary, CD-550 methoxy polyethylene glycol (350) monomethacrylate, CD-582 alkoxylated cyclohexane dimentanol diacrylate, CD-611 alkoxylated tetrahydrofurfuryl acrylate CD-800 proprietary (Sartomer), CD-9042 proprietary (Sartomer), CD-9044 proprietary (Sartomer), CD-9051 trifunctional acid ester, CD9052 trifunctional acid ester, CD-9075 proprietary (Sartomer), and CD-9088 proprietary (Sartomer). Suitable monomers may also include the following oligomer materials available from Sartomer: CN966A80 urethane acrylate blended with tripropylene glycol diacetate, CN963B80 urethane acrylate blended with tripropylene glycol diacetate, CN985B88 proprietary (Sartomer) urethane acrylate blended with ethoxylated (3) trimethylopropane, CN963E75 triacrylate urethane acrylate blended with ethoxylated (3) trimethylopropane, CN982E75, CN966R6O urethane acrylate blended with ethoxylated (4) nonyl phenol acrylate, CN981B88 urethane acrylate blended with 1,6-hexanediol diacrylate, and CN966J75 urethane acrylate blended with isobornyl acrylate. CN-975 hexafunctional urethane acrylate, and CN-968 urethane acrylate.

It will be appreciated that different monomers, oligomers, and/or mixtures thereof may be better suited for different printing systems, printing applications and/or printing mediums. For example, as described above, printheads designed for use with aqueous-based printing fluids may require a printing fluid to have a relatively low viscosity for proper printhead performance. Therefore, embodiments configured for use with such printheads may utilize low-viscosity monomers (for example, with a viscosity of approximately 15 cps or lower) as a majority component of the printing fluid, with smaller combinations of higher viscosity and/or higher functionality monomers as appropriate. Specific examples of monomers that may be suitable for such printing fluids include those listed in the following table, available from Sartomer and from the Cognis Corp., USA of Cincinnati, Ohio.

| Part Number | Chemical Description | Viscosity |
|---|---|---|
| Sartomer | | |
| SR484 | Octydecyl acrylate | 4 |
| SR395 | Isodecyl acrylate | 5 |
| SR440 | Isooctyl acrylate | 5 |
| SR256 | 2-(2-ethoxyethoxy) ethyl acrylate | 6 |
| SR285 | tetrahydrofurfuryl acrylate | 6 |
| SR335 | Laurel acrylate | 6 |
| SR489D | Tridecyl acrylate | 7 |
| SR506 | Isobornyl Acrylate | 8 |
| SR212B | 1,3-butylene glycol diacrylate | 9 |
| SR238 | 1,6 hexanediol diacrylate | 9 |
| SR508IJ | dipropylene glycol diacrylate | 10 |
| SR247 | Neopentyl glycol diacrylate | 10 |
| CD611 | alkoxylated tetrahydrofurfuryl acrylate | 11 |
| SR339 | 2-Phenoxyethyl acrylate | 12 |
| SR531 | Cyclic trimethylolpropane formal acrylate | 13 |
| SR9003IJ | Propoxylated neopentyl glycol diacrylate | 15 |
| Cognis | | |
| Photomer 8127 | Propoxylated neopentyl glycol monomethyl ether diacrylate | 8 |
| Photomer 8061 | Tripropylene glycol monomethyl ether acrylate | 8 |
| Photomer 4814 | Myristyl acrylate | 8.5 |
| Photomer 4017 | 1,6-Hexanediol diacrylate | 9 |
| Photomer 4226 | dipropylene glycol diacrylate | 10 |
| Photomer 4816 | Hexadecyl acrylate | 10 |
| Photomer 4102 | Decanediol diacrylate | 12 |
| Photomer 4061 | Tripropylene glycol diacrylate | 15 |

A printing fluid according to the present disclosure may include the monomer or mixture of monomers in any suitable amount. Examples of suitable amounts include, but are not limited to, amounts between approximately 20 weight percent to approximately 99 weight percent. In some embodiments, monomer concentrations between approximately 50 and 90 weight percent may be used. In general, the greater amount of monomer used, the greater the solids content in the printing fluid. Where a mixture of monomer is used, the individual components may have any suitable concentrations within these ranges. For example, where a printing fluid contains a mixture of a low-viscosity mono-functional monomer and a di-functional or higher functional monomer, the di-functional or higher functional monomer may be present in a concentration of approximately 5-20 weight percent, and the mono-functional monomer may comprise a majority (i.e. 50% by weight or more) of the printing fluid. Such a mixture may provide a fluid having a suitably low viscosity for thermal ejection and may form a suitably durable cured film.

In some embodiments, the monomer mixture may have the right volatility characteristics to be vaporizable by the firing resistor and form a sufficiently strong bubble to act as its own driver fluid. In other embodiments, the monomers and/or monomer mixtures may not be sufficiently volatile. In these embodiments, an additional volatile driver fluid may be used to drive the ejection of the fluid upon heating. Any suitable driver fluid may be used as an additional driver fluid. Suitable additional driver fluids include fluids that are at least partially miscible with the monomer or monomer mixture to avoid separation from the monomer, fluids that have a sufficiently low boiling point and/or energy of vaporization to form a sufficiently large bubble for proper printing performance, and/or fluids that require little or no drying after curing (for example, fluids that may be included in a sufficiently small amount to be incorporated into the cured polymer matrix, that evaporate when exposed to the curing energy source, and/or that otherwise do not interfere substantially with the curing of the film). Examples of suitable additional driver fluids include, but are not limited to, fluids having a boiling point below approximately 75 degrees Celsius, such as acetone, methyl or ethyl acetate, low alcohols such as methanol, ethanol and propanols, and mixtures thereof.

The use of such an additional driver fluid may allow a non-aqueous or substantially non-aqueous printing fluid to be used with many currently-manufactured thermal ejection printheads designed for aqueous printing fluids while avoiding a slow-drying aqueous formulation with potentially poor solubility in the monomer or monomer mixture. Furthermore, the use of acetone or a lower alcohol or acetate as a driver fluid may allow the driver fluid to be more easily removed from the printed film than an aqueous-based solvent due to the lower polarity and higher volatility of the lower alcohols, acetates and acetone compared to water. As used herein, the term "nonaqueous" may refer to compositions in which a small amount of water may be present, for example, due to its presence in the alcohol prior to formulation, and/or due to atmospheric water, but to which water was not added as an intended ingredient. Likewise, the term "substantially non-aqueous" may refer to solutions in which water is present in a relatively low concentration (for example, less than 10 weight percent), but to which the water is added as an intended or incidental component (for example, via an aqueous pigment dispersion or emulsion, etc.). Such printing fluids may offer the advantage over aqueous (as well as some other high-solvent printing fluids) that the printed fluid does not need to be dried with a heat source before curing. However, it will be appreciated that some water may be added to embodiments of the disclosed printing fluids, depending upon the intended use for the fluids.

The driver fluid may be included in a printing fluid according to the present disclosure in any suitable concentration. Suitable concentrations include, but are not limited to, concentrations from 0 (with the use of a suitable monomer as a driver fluid) to 50 percent by weight. In more specific embodiments, the driver fluid may be present in a range of between approximately 15 and 35 percent by weight.

Under some conditions and with some printing fluids, the repeated firing of the firing resistor can result in the buildup of residue, sometimes referred to as "koga", on the resistor surface. This process may be referred to as "kogation." Kogation may be considered a "charring" of printing fluid components on the firing resistor surfaces. Kogation may result in a loss of drop velocity and drop weight of the individual printing fluid droplets ejected. Without wishing to be bound by theory, the koga may either disrupt the even growth of the bubble by providing low energy nucleation sites, or may interfere with heat transfer by acting as a thermal insulator. The lost of drop weight over the lifetime of the printhead may reduce the optical density of the printing fluid on the paper, and may also reduce the accuracy of droplet placement, thereby degrading print performance.

It has been found that, in the absence of preventative measures, thermal printheads may suffer relatively short lifetimes when used to print curable printing fluids due to kogation. Therefore, to increase the lifetime of the printheads, a resistor protectant configured to prevent kogation may be included in the printing fluid.

Without wishing to be bound by theory, some resistor protectants may function as surfactants that bind to the resistor surface and prevent other printing fluid components from undergoing reactions on the resistor surface. Firing resistors are often coated with an outer surface layer of a refractory metal material, such as titanium, zirconium, hafnium, vanadium, niobium, tantalum, chromium, molybdenum, tungsten, gold or silver, to help reduce cavitation damage to the resistor caused by the collapse of the drive bubble after fluid droplet ejection occurs. Resistor protectants in the printing fluid may bind to the metal, and hydrocarbon and/or alkoxy functional groups on the resistor protectants may help to prevent the adsorption of dyes and/or other printing fluid components onto the metal resistor coating. These resistor protectants thereby may help to prevent surface reactions that may degrade the adsorbed ink components into insoluble deposits.

In some embodiments, the resistor protector may be included as part of another component. For example, some commercially available colorant solutions may include surfactants or other compounds with resistor protectant ability. In other embodiments, a resistor protectant may be added as a separate printing fluid component. In these embodiments, any suitable protectant may be used. Examples of suitable resistor protectants include, but are not limited to, phosphate esters with a structure of $(R-O-E_x)_y PO_{(4-y)} H_{(3-y)}$, wherein R is a branched hydrocarbon, unbranched hydrocarbon, or perfluorinated hydrocarbon moiety with at least eight carbons, E is an ethoxy group ($-CH_2CH_2O-$) or a methyl ethoxy group ($-C(CH_3)HCH_2O-$), X is 0 or a positive integer, and Y is an integer from 1 to 3. More specific examples of suitable resistor protectants include compounds from the chemical class tridecyl alcohol ethoxylates. Specific examples of commercially available suitable resistor protectants that may help to increase printhead lifetime include DEXTROL OC-70 (phosphate ester of tridecyl alcohol ethoxylate), DEXTROL OC-22 (phosphate ester of nonyl phenol ethoxylate), STRODEX MO-100 (phosphated alcohol) and STRODEX P-100 (phosphate coester of alcohol and aliphatic ethoxylate) from Dexter Chemical of New York, N.Y.; STEPFAC 8171 (nonylphenol POE 6 phosphate ester), STEPFAC 8180 (phosphate esters of an alkyl polyethoxyethanol), STEPFAC 8181 (phosphate ester of an alkyl polyethoxyethanol), and STEPFAC 8170 (nonylphenol POE 10 phosphate ester) from the Stepan Company of Northfield, Ill.; MAPHOS M-60A (aliphatic phosphate ester), and MAPHOS 8135 (aromatic phosphate ester) from BASF of Ludwigshafen, Germany; and ULTRASIL PE-100 (dimethicone PEG-8 phosphate) from ULTRASIL Corporation of Haywood, Calif.

These resistor protectants may be effective in protecting resistors with many common types of outer resistor surface materials, including but not limited to resistors with titanium, zirconium, hafnium, vanadium, niobium, tantalum, chromium, molybdenum, tungsten, gold, silver and platinum outer layers.

The resistor protectant may be present in a printing fluid according to the present disclosure in any suitable concentration. Suitable concentrations include, but are not limited to, concentrations between approximately 0.1-10 weight percent. In more specific embodiments, the resistor protectant may be added to the printing fluid in a concentration of approximately 2-6 weight percent or volume percent.

A printing fluid according to the present invention may be configured to be cured via any suitable energy source. For example, in some embodiments, the printing fluid may be configured to be cured by exposure to an electron beam after printing. In these embodiments, the electrons in the electron beam have sufficient energy to initiate the polymerization of the curable monomer components of the printing fluid. Such a printing fluid may also be cured by exposure to an ion plasma. The printing fluid may be configured to be curable by exposure to an electron beam (or other particle radiation) or ion plasma having an intensity of approximately 50 to 500 mJoules/cm$^2$, or may be configured to be curable by exposure to an electron beam (or other particle radiation) or ion plasma having either a higher or lower intensity.

In other embodiments, the printing fluid may be configured to be curable by exposure to ultraviolet radiation. In these embodiments, the printing fluid may include a photoinitiator that creates free radicals upon the absorption of UV light. The free radicals then initiate the polymerization of the curable monomer or monomer mixture. UV light of any suitable wavelength and energy intensity may be used to cure the printing fluid. For example, the printing fluid may be configured to be curable by exposure to UV light having an intensity of approximately 50 to 500 mJoules/cm$^2$, and/or by exposure to UV light having a wavelength of between 220 and 450 nm.

Any suitable photoinitiator or photoinitiators may be used in a printing fluid according to the present disclosure. Examples include, but are not limited to, benzophenone, trimethylbenzophenone, methylbenzophenone, 2-hydroxy-2-methyl-1-phenyl-1-propanone, benzyl dimethyl ketal, isopropyl thiooxanthone, 1-hydroxy-cyclohexyl-phenyl-ketone, ethyl 4-(dimethylamino) benzoate, and like compounds. Examples of suitable commercially available initiators include IRGACURE 369 (2-benzyl-2-(dimethylamino)-1-[4-(4-morpholinyl) phenyl]-1-butanone), IRGACURE 907 (2-methyl-1[4-(methylthio)phenyl]-2-morpholinopropan-1-one), IRGACURE 1300 (30% 2-benzyl-2-(dimethylamino)-1-[4-(4-morpholinyl) phenyl]-1-butanone and 70% 2,2-dimethoxy-1,2-diphenylethan-1-one), DAROCUR ITX (mixture of 2-isopropylthioxanthone and 4-isopropylthioxanthone), IRGACURE 819 (phosphine oxide, phenyl bis(2, 4,6-trimethylbenzoyl) phosphine oxide), IRGACURE 500 (mixture of benzophenone & 1-hydroxycyclohexyl phenyl ketone), and IRGACURE 379 (2-dimethylamino-2-(4-methyl-benzyl)-1-(4-morpholin-4-yl-phenyl)-butan-1-one) from Ciba Specialty Chemicals of Tarrytown, N.Y.; CN386 (amine acrylate & acrylic ester) from Sartomer of Exton, Pa., and ESACURE KT046 (a mixture of trimethylbenzoyldiphenylphosphine oxide, a-hydroxyketones, benzophenone derivatives) and ESACURE TZT (a mixture of 2,4,6 trimethylbenzophenone & 4 methylbenzophenone) from Lamberti SPA of Italy. Furthermore, in some embodiments, more than one photoinitiator may be used. For example, in some embodiments, different photoititiators (and/or coinitiators)

may be used to cure the surface and the bulk of the printed fluid. Examples of suitable coinitiators include, but are not limited to, N-371 reactive amine coinitiator CN-386 reactive amine coinitiator, CN-372 reactive amine coinitiator, CN-384 reactive amine coinitiator, CN-383 reactive amine coinitiator, and CN-373 reactive amine coinitiator, all from Sartomer.

The photoinitiator may be present in a printing fluid in any suitable concentration. Examples of suitable concentration concentrations of photoinitiator include, but are not limited to, concentrations in the range of between approximately 0.1-20 weight percent.

In some embodiments, the printing fluid may be configured to have no color and/or to print a clear film onto a printing medium. Such a printing fluid may be used, for example, as a build fluid to which colorants may be added, or as a protective coating or adhesion layer. In other embodiments, the printing fluid may include one or more colorants. Suitable colorants include, but are not limited to, pigments, dyes, pigment-resin systems, and combinations thereof.

A colorant may be added to a printing fluid according to the present invention in any suitable amount. Suitable amounts of colorant or mixtures of colorant include amounts that give a desired color intensity, brightness, hue and/or saturation, and/or amounts that provide a desired chemical or physical characteristic (for example, surface tension, viscosity, boiling point, etc.) to the printing fluid. Examples of suitable amounts of colorant include, but are not limited to, colorants in a concentration of 0.1-20 weight percent.

As mentioned above, in some embodiments, one or more oligomers may be added to the printing fluid. Oligomers may be used to adjust various physical properties of the cured printed film, including chemical resistance, flexibility, weatherability, and shrinkage. Suitable oligomers that may be added to a printing fluid according to the present disclosure include but are not limited to acrylated urethanes, epoxies, polyesters and acrylics. Furthermore, the oligomers may be added to the printing fluid in any suitable amounts. Suitable amounts include, but are not limited to, amounts in a range of approximately 0.1 to 80 percent by weight.

Various other additives may also be added to a printing fluid according to the present disclosure. For example, an adhesion promoter may be added to the printing fluid composition, wherein the adhesion promoter may be configured to bind the cured printed film more strongly to the printing medium. Any suitable adhesion promoter may be used. Examples of suitable adhesion promoters include compounds within the chemical class of 1, 2 butyl glycol diacrylate ester. It will be appreciated that the choice of adhesion promoter may depend upon the properties of the media on which the printing fluid will be used.

It will further be appreciated that adhesion promoters, oligomers and colorants are merely examples of types of additives that may be used in conjunction with a printing fluid according to the present disclosure, and that other suitable additives may also be used. Other types of additives that may be added include surfactants, defoamers, levelers, co-solvents, compatabilizers, dispersants, antiblocking additives, and additives for scrub resistance, matting, water repellency, anti slip, increased gloss, rheological properties, viscosity depressants, and increased transparency.

EXAMPLES

To measure the effect of selected resistor protectants on the lifetime of a thermal fluid ejection printhead, a control UV-curable printing fluid was prepared with 30% by volume, and a series of experimental black-pigmented UV-curable printing fluids containing 30% methanol by volume were prepared, each having 3% by volume of a resistor protectant. The total number of drops fired per resistor before failure is shown in the right-hand column of the below table. An asterisk in the right-hand column indicates that the printhead was still good after the number of drops shown had been fired.

| Resistor Protectant | Millions of drops fired |
|---|---|
| Control with no additive | 0.45 |
| DEXTROL OC-70 | 8.60* |
| DEXTROL OC-22 | 5.50* |
| STEPFAC 8171 | 3.43* |
| STEPFAC 8180 | 3.25 |
| STRODEX MO-100 | 3.14* |
| STEPFAC 8181 | 2.56 |
| MAPHOS M-60A | 1.54 |
| STRODEX P-100 | 1.33 |
| MAPHOS 8135 | 1.15 |
| STEPFAC 8170 | 1.15 |
| ULTRASIL PE-100 | 0.78 |
| CHEMPHOS 444 | 0.55 |
| MAPHOS M-60 | 0.49 |
| CHEMPHOS 421 | 0.45 |

A control UV-curable printing fluid was also prepared with 30% ethanol by volume, and a series of experimental black-pigmented UV-curable printing fluids containing 30% ethanol by volume were prepared. The total number of drops fired per resistor before failure is shown in the right-hand column of the below table, and the concentration of resistor protectant is shown in the center column. An asterisk in the right-hand column indicates that the printhead was still good after the number of drops shown had been fired.

| Resistor Protectant | Protectant (% volume) | Millions of Drops Fired |
|---|---|---|
| Control with no additive | 0 | 0.45 |
| DEXTROL OC-70 | 3 | >2.7* |

Black-pigmented UV-curable printing fluids having 3% by volume of DEXTROL OC-70 as a resistor protectant were also prepared with other driver fluid compositions than pure methanol and pure ethanol. The total number of drops fired per resistor before failure is shown in the right-hand column of the below table, and the driver fluid composition is shown in the center column. An asterisk in the right-hand column indicates that the printhead was still good after the number of drops shown had been fired.

| Resistor Protectant | Driver Fluid (% volume) | Millions of Drops Fired |
|---|---|---|
| DEXTROL OC-70 | 10% MeOH + 10% EtOH | 8.60* |
| DEXTROL OC-70 | 30% isopropyl alcohol | >2.92* |
| DEXTROL OC-70 | 10% MeOH + 10% EtOH + 10% Acetone | >2.25* |

Various different compositions of printing fluids according to the present disclosure have been prepared and successfully printed and cured via a thermal fluid ejection printhead and UV lamp, respectively. Several exemplary compositions are as follows:

Exemplary Composition 1

| Component | Weight % of Printing Fluid |
| --- | --- |
| SR508IJ | 49.65 |
| CN386 | 6.67 |
| SR1135 | 5.34 |
| SR1137 | 4 |
| BYK-088 (anti-foaming additive) | 0.33 |
| IRGASTAB UV-10** | 0.17 |
| DEXTROL OC-70 | 3.3 |
| Black Dispersion 9B-898* | 6.67 |
| Methanol | 23.7 |
| BYK-3500 | 0.17 |

*available from Penn Color of Doylestown, PA
**available from Ciba Specialty Chemicals

Exemplary Composition 2

| Component | Weight % of Printing Fluid |
| --- | --- |
| SR440 | 22.92 |
| SR212 | 28.51 |
| CIBA 907 | 5.50 |
| CIBA 1300 | 5.50 |
| CIBA ITX | 1.10 |
| Black Dispersion 9B-732 (Penn Color) | 9.77 |
| DEXTROL OC-70 | 3.00 |
| Methanol | 23.70 |

Exemplary Composition 3

| Component | Weight % of Printing Fluid |
| --- | --- |
| SR508 | 25.36 |
| SR212 | 28.51 |
| CIBA 907 | 5.50 |
| CIBA 1300 | 5.50 |
| CIBA ITX | 1.10 |
| Black Dispersion 9B-732 | 7.33 |
| DEXTROL OC-70 | 3.00 |
| Methanol | 23.70 |

Exemplary Composition 4

| Component | Weight % of Printing Fluid |
| --- | --- |
| SR508 | 51.43 |
| CIBA 907 | 5.50 |
| CIBA 1300 | 5.50 |
| CIBA ITX | 1.10 |
| Black Dispersion D3110K* | 9.77 |
| DEXTROL OC-70 | 3.00 |
| Methanol | 23.70 |

*available from RJA Dispersions of Mapelwood, MN

Exemplary Composition 5

| Component | Weight % of Printing Fluid |
| --- | --- |
| SR506 | 25.36 |
| SR212 | 28.51 |
| CIBA 907 | 5.50 |
| CIBA 379 | 1.65 |
| CIBA ITX | 1.10 |
| CIBA 651 | 3.85 |
| Black Dispersion 9B-898 (Penn Color) | 7.33 |
| DEXTROL OC-70 | 3.00 |
| Methanol | 23.70 |

Exemplary Composition 6

| Component | Weight % of Printing Fluid |
| --- | --- |
| SR506 | 40.32 |
| Black Dispersion 9B-898 (Penn Color) | 7.33 |
| CN131B | 7.33 |
| BYK-088 | 0.37 |
| BYK-3500 | 0.37 |
| CN386 | 7.33 |
| SR1135 | 5.86 |
| SR1137 | 4.40 |
| DEXTROL OC-70 | 3.00 |
| Methanol | 23.70 |

Exemplary Composition 7 (Yellow Fluid)

| Component | Weight % of Printing Fluid |
| --- | --- |
| SR440 | 23.82 |
| SR212 | 28.59 |
| CIBA 907 | 5.50 |
| CIBA 1300 | 5.50 |
| CIBA ITX | 1.10 |
| Blk Disp 9Y-686 | 8.80 |
| DEXTROL OC-70 | 3.00 |
| Methanol | 23.70 |

Exemplary Composition 8 (Magenta Fluid)

| Component | Weight % of Printing Fluid |
| --- | --- |
| SR440 | 25.66 |
| SR212 | 28.59 |
| CIBA 907 | 9.90 |
| CIBA ITX | 1.10 |
| Black Dispersion 9R-715 | 8.06 |
| DEXTROL OC-70 | 3.00 |
| Methanol | 23.70 |

The printing fluids disclosed herein may be used in a wide range of applications and may be configured to print on a wide range of media than is possible with conventional aqueous thermally ejectable printing fluids. Examples of potential media and applications include, but are not limited to, mail printing and package marking and coding on media such as glossy non-porous surfaces such as plastics, glass, metal, offset printed material as well as on green (wet) wood, porous ceramic and paper products. Many such media may cause conventional thermally ejectable printing fluids to bleed down the fibers causing fuzzy print, or coalesce or bead, thereby creating a poor quality print with a slowed drying time and increased risk of smearing. However, a printing fluid according to the present disclosure may permit high-definition prints to be made that dry almost instantly and fix in place with substantially no bleed or color mixing. Such prints may be able to be handled immediately without smearing or marring, and may be waterfast upon curing.

Printing of a printing fluid according to the present disclosure may be performed in any suitable manner. One example of a suitable method of printing with the disclosed printing fluids is as follows. First, the printing fluid may be provided to a thermal fluid ejection printhead. Next, current is directed through one or more firing resistors in the fluid ejection printhead, thereby causing the vaporization of the driver fluid, which forms a bubble and causes the ejection of one or more droplets of printing fluid from the printhead onto a printing media. After the printing fluid has been transferred to the printing media, the fluid on the printing media may be exposed to an energy source to cause polymerization of the printing fluid, which may occur rapidly.

The printing media and printhead may be moved relative to one another in any suitable manner to effect printing. For example, in some embodiments, the printing media is moved adjacent to the printhead in a batchwise manner, while in other embodiments, the printing media is moved adjacent to the printhead in a continuous manner. In yet other embodiments, the printhead may be moved relative to a stationary media or a moving media. Likewise, the curing also may be performed in any suitable manner. For example, the printing media may be exposed to ultraviolet light or other electromagnetic radiation to initiate curing. Alternatively, the printing media may be exposed to an electron beam, a plasma, or other source of particle radiation.

Although the present disclosure includes specific embodiments, specific embodiments are not to be considered in a limiting sense, because numerous variations are possible. The foregoing embodiments are illustrative, and no single feature, component, or action is essential to all possible combinations that may be claimed in this or later applications. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "a" or "a first" element or the equivalent thereof. Such claims should be understood to include incorporation of one or more such elements, neither requiring nor excluding two or more such elements. Further, ordinal numbers, such as first, second, and third, for identified elements or actions are used to distinguish between the elements and actions, and do not indicate a required or limited number of such elements or actions, nor a particular position or order of such elements or actions unless otherwise specifically stated. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A curable printing fluid composition for a thermal fluid ejection device, comprising:
   a curable liquid-phase monomer;
   a substantially nonaqueous volatile driver fluid capable of being vaporized by a thermal fluid ejection printhead;
   an initiator;
   a phosphate ester resistor protectant; and
   a colorant comprising a dye.

2. The composition of claim 1, wherein the liquid-phase monomer comprises an acrylic monomer.

3. The composition of claim 1, wherein the liquid-phase monomer comprises a mixture of two or more acrylic monomers, wherein at least one of the acrylic monomers is a mono-functional monomer and wherein at least one other of the acrylic monomers is a di-functional monomer.

4. The composition of claim 1, wherein the liquid-phase monomer is the driver fluid.

5. The composition of claim 1, wherein the driver fluid comprises at least one of methanol, ethanol, propanol, acetone, methyl acetate and ethyl acetate.

6. The composition of claim 5, wherein the composition comprises approximately 15 to 35 percent driver fluid by total composition volume.

7. The composition of claim 1, wherein the phosphate ester resistor protectant has a general formula of $(R-O-E_x)_y PO_{(4-y)}H_{(3-y)}$, wherein R is a branched hydrocarbon, unbranched hydrocarbon, or perfluorinated hydrocarbon moiety with at least eight carbons, E is $CH_2CH_xO$ or $C(CH_3)HCH_2O$, x is zero or an integer greater than zero, and y is an integer from 1 to 3.

8. The composition of claim 1, wherein the composition comprises approximately 1 to 6 percent resistor protectant by total composition volume.

9. The composition of claim 1, further comprising one or more oligomers selected from epoxies, polyesters, acrylics, and acrylic urethanes.

10. The composition of claim 1, further comprising an adhesion promoter.

11. The composition of claim 10, wherein the adhesion promoter comprises a 1,2 butyl glycol diacrylic ester.

12. The composition of claim 10, wherein the composition comprises 0.1 to 20 percent adhesion promoter by total composition weight.

13. A thermal inkjet printing cartridge comprising a printhead and a UV-curable printing fluid composition for a thermal fluid ejection device, the printing fluid composition comprising:
   at least one di-functional acrylic monomer;
   at least one substantially nonaqueous driver fluid present in an amount of 0.1 to 50 weight percent by total composition weight;
   at least one photoinitiator;
   a dye; and
   at least one phosphate ester resistor protectant present in an amount of 0.1 to 10 weight percent by total composition weight.

14. The cartridge of claim 12, wherein the composition has a viscosity equal to or less than approximately 20 cps.

15. The cartridge of claim 12, wherein the composition has a surface tension of between approximately 20 to 50 dyne/cm.

16. The cartridge of claim 12, wherein the di-functional acrylic monomer is present in an amount of 0.1 to 90 weight percent by total composition weight.

17. The cartridge of claim 12, wherein the substantially nonaqueous driver fluid is present in an amount of 5 to 40 weight percent by total composition weight.

18. The cartridge of claim 12, wherein the phosphate ester resistor protectant has a general formula of $(R\text{—}O\text{-}E_x)_y PO_{(4-y)}H_{(3-y)}$, wherein R is a branched hydrocarbon, unbranched hydrocarbon, or perfluorinated hydrocarbon moiety with at least eight carbons, E is $CH_2CH_xO$ or $C(CH_3)HCH_2O$, x is zero or an integer greater than zero, and y is an integer from 1 to 3.

19. The cartridge of claim 12, wherein the resistor protectant is present in an amount of 2 to 6 weight percent by total composition weight.

20. The cartridge of claim 12, wherein the composition further comprises an adhesion promoter.

\* \* \* \* \*